(12) United States Patent
Pechtold (10) Patent No.: US 7,575,020 B2
(45) Date of Patent: Aug. 18, 2009

(54) MULTI STAGE PRESSURE REGULATOR

(75) Inventor: Rainer Pechtold, Russelsheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 274 days.

(21) Appl. No.: 11/467,579

(22) Filed: Aug. 28, 2006

(65) Prior Publication Data

US 2008/0047619 A1    Feb. 28, 2008

(51) Int. Cl.
*G05D 16/02*    (2006.01)
(52) U.S. Cl. .............. 137/505.12; 137/505.42; 137/599.16; 137/630.22
(58) Field of Classification Search ........... 137/505.12, 137/505.18, 505.38, 505.42, 599.16, 630.14, 137/630.22
See application file for complete search history.

(56) References Cited

U.S. PATENT DOCUMENTS

| | | | | |
|---|---|---|---|---|
| 814,285 A | * | 3/1906 | Gold | ................ 137/630.15 |
| 2,331,084 A | * | 10/1943 | Sorensen | ................ 137/454.5 |
| 2,731,975 A | * | 1/1956 | Boals | ................ 137/505.18 |
| 2,925,824 A | * | 2/1960 | Rockwell | ................ 137/505.41 |
| 3,045,688 A | * | 7/1962 | Fay | ................ 137/601.01 |
| 3,576,193 A | * | 4/1971 | Rothfuss et al. | ................ 137/505.12 |
| 4,984,602 A | | 1/1991 | Saito et al. | |
| 5,178,767 A | | 1/1993 | Nickerson et al. | |
| 5,234,026 A | * | 8/1993 | Patterson | ................ 137/505.18 |
| 5,285,810 A | * | 2/1994 | Gotthelf | ................ 137/505.18 |
| 5,413,311 A | | 5/1995 | Arstein et al. | |
| 6,866,061 B2 | | 3/2005 | Ye et al. | |

* cited by examiner

*Primary Examiner*—Stephen Hepperle
(74) *Attorney, Agent, or Firm*—Fraser Clemens Martin & Miller LLC; J. Douglas Miller (57) ABSTRACT

A pressure regulator is disclosed wherein multiple valve stages are used to accommodate low flow rates and to maximize a turn-down ratio of the regulator.

15 Claims, 10 Drawing Sheets

MULTI STAGE PRESSURE REGULATOR

FIELD OF THE INVENTION

The invention relates to a pressure regulator and, more particularly, to a pressure regulator that includes multiple valve stages to maximize a performance thereof during low flow rate operation and to maximize a turn-down ratio of the regulator.

BACKGROUND OF THE INVENTION

A hydrogen fuel cell is an electro-chemical device that includes an anode and a cathode with an electrolyte therebetween. The anode receives a fuel such as hydrogen gas and the cathode receives a fluid such as oxygen or air. Several fuel cells are typically combined in a fuel cell stack to generate a desired amount of power. A typical fuel cell stack for a vehicle may include several hundred individual cells. Typically, the fluid is caused to flow through the stack by a compressor. Oxygen not consumed in the stack is expelled as a cathode exhaust gas that may include water as a stack by-product.

Pressure regulators are employed in fuel cell systems at various locations to control pressures and flow rates. For example, pressure regulators may be employed at the anode side of the fuel cell stack to provide a pressure reduction of the hydrogen gas flowing from a hydrogen pressure storage tank and at an anode inlet to the stack. At the output of the hydrogen pressure tank, the pressure regulator may be required to reduce the pressure from 30-700 bar (abs) to 4-9 bar (abs). At the input to the anode side of the fuel cell stack, the pressure reduction may be from 4-9 bar (abs) to 1-2 bar (abs). In both of these applications, the hydrogen flow rate may vary between 0.02 and 2.0 g/s. These parameters provide a regulator turn-down ratio or range of operation of about 1:100.

Known pressure regulators are generally designed for turn-down ratios in the range of 1:10 to 1:20, and typically require a relatively constant inlet pressure. Such pressure regulators are typically not suitable for fuel cell system applications because of the accurate pressure regulation required at low flow rates and tight flow control necessary for the anode input.

It would be desirable to develop a pressure regulator capable of accommodating high turn down ratios, wherein an accuracy in accommodating low flow rates is maximized.

SUMMARY OF THE INVENTION

Harmonious with the present invention, a pressure regulator capable of accommodating high turn down ratios, wherein an accuracy in accommodating low flow rates is maximized, has surprisingly been discovered.

In one embodiment, a pressure regulator comprises a main body defining a valve seat and a flow path, the flow path having an inlet and an outlet; a valve assembly disposed in the main body along the flow path and including a first head and a second head, the first head being movable with respect to and sealable with the second head, the second head being movable with respect to and sealable with the valve seat; a sealing member disposed in the main body, wherein the first head facilitates flow of a fluid in a first range of flow rates and the first head and the second head cooperate to facilitate flow of the fluid in a second range of flow rates.

In another embodiment, a pressure regulator comprises a main body defining a flow path, the flow path having an inlet and an outlet; a sealing member defining a valve seat and an orifice, the sealing member reciprocatingly disposed in a second chamber formed in the main body; a valve assembly disposed in a first chamber formed in the main body and coupled to the sealing member, the valve assembly including a first head and a second head, the first head being movable with respect to and sealable with the second head, the second head being movable with respect to and sealable with the valve seat; an inlet port formed in the main body in fluid communication with the first chamber and the flow path; and an outlet port formed in the main body in fluid communication with the second chamber and the flow path.

In another embodiment, a flow control pressure regulator for controlling a fluid flow comprises a main body defining a valve seat and a flow path, the flow path having an inlet and an outlet; a valve assembly disposed in a first chamber formed in the main body and including a first head and a second head, the first head being movable with respect to and sealable with the second head, the second head being movable with respect to and sealable with the valve seat; a sealing member reciprocatingly disposed in a second chamber formed in the main body, the sealing member coupled to the valve assembly; a first spring disposed between the main body and the sealing member; a second spring disposed between the main body and the valve assembly; an inlet port formed in the main body in fluid communication with the first chamber and the flow path; and an outlet port formed in the main body in fluid communication with the second chamber and the flow path.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
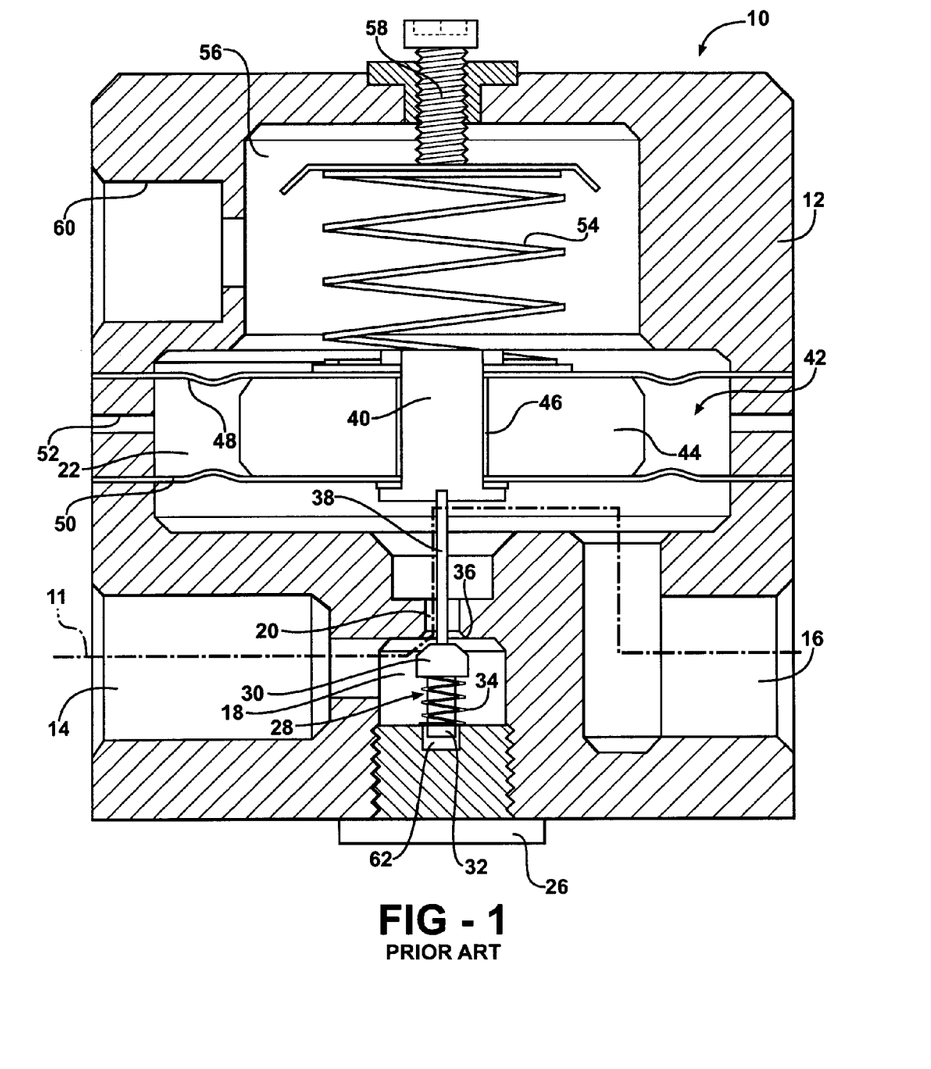
FIG. 1 is a cross sectional view of a known pressure regulator.

FIG. 1 shows a known pressure regulator 10 having regulator body 12. A fluid flows into an inlet port 14 and exits the regulator 10 at an outlet port 16. As used herein, the term fluid refers to a liquid, gas, or any combination thereof. The fluid flows along a flow path 11 through the inlet port 14 to a first chamber 18, through an orifice 20, and into a second chamber 22. The second chamber 22 is in fluid communication with the outlet port 16.

The flow of the fluid from the inlet port 14 to the outlet port 16 is controlled by a valve 28 positioned within the first chamber 18. The valve 28 includes a valve head 30, a valve body 32, and a valve spring 34 disposed around the valve body 32. The valve head 30 seats against a tapered valve seat 36 positioned at an entrance portion of the orifice 20. The valve spring 34 urges the valve head 30 into engagement with the valve seat 36. An adjustment element 26 is disposed in a threaded aperture formed in the regulator body 12. A shaft 38 is interposed between the valve head 30 and a cylindrical member 40 disposed in the second chamber 22. A membrane assembly 42 is disposed in the second chamber 22 and includes a support structure 44 with a central bore 46 formed therein. The cylindrical member 40 is received in the central bore 46. A pair of membranes 48, 50 is disposed on opposing sides of the support structure 44. A peripheral edge of the membranes is restrained by the regulator body 12. The regulator body 12 optionally includes a port 52 formed therein to facilitate a monitoring for leakage through the membranes 48, 50.

A spring 54 is disposed in a spring chamber 56. A first end of the spring 54 abuts the support structure 44 and a second end of the spring abuts a screw 58. A reference port 60 is in fluid communication with the chamber 56. The spring 54 applies a bias against the membrane assembly 42 as set by the screw 58. A force applied by the spring 54 to the support structure 44 is adjusted by rotating the screw 58 to change an amount of compression in the spring 54.

In use in a fuel cell, when a greater hydrogen flow rate is required, hydrogen flow away from the outlet port 16 increases, which results in a decrease in the pressure at the outlet port 16. It is understood that other fluids can be used without departing from the spirit or scope of the invention. The decrease in pressure is transferred to the portion of the chamber 22 below the membrane 50, thereby permitting the spring 54 to extend linearly. Therefore, the membrane assembly 42 and the shaft 38 move downwardly. The downward movement of the shaft 38 causes at least a portion of the valve body 32 to be positioned in a bore 62 formed in the adjusting element 26. The head 30 is caused to move further from the valve seat 36 and permit additional hydrogen flow from the inlet port 14 through the orifice 20. As the demand for hydrogen decreases, hydrogen flow away from the outlet port 16 decreases, which results in an increase in the pressure at the outlet port 16. The increase in pressure is transferred to the portion of the chamber 22 below the membrane 50, thereby causing the spring 54 to compress linearly. This causes the head 30 to move closer to the valve seat 36 and reduces the hydrogen flow rate through the orifice 20.

Because the size of the orifice 20 at the valve seat 26 is fixed, the flow rate between a fully closed position and a fully opened position of the valve 28 is also fixed resulting in a low turn-down ratio. Pressure regulators are designed to provide for the maximum flow that will be demanded. However, this provides poor flow sensitivity at low flow rates due to the size of the orifice 20 in combination with the movement of the valve head 30 away from the valve seat 36. Additionally, the valve 28 may oscillate during a low flow condition resulting in poor flow sensitivity.

Figure 2:
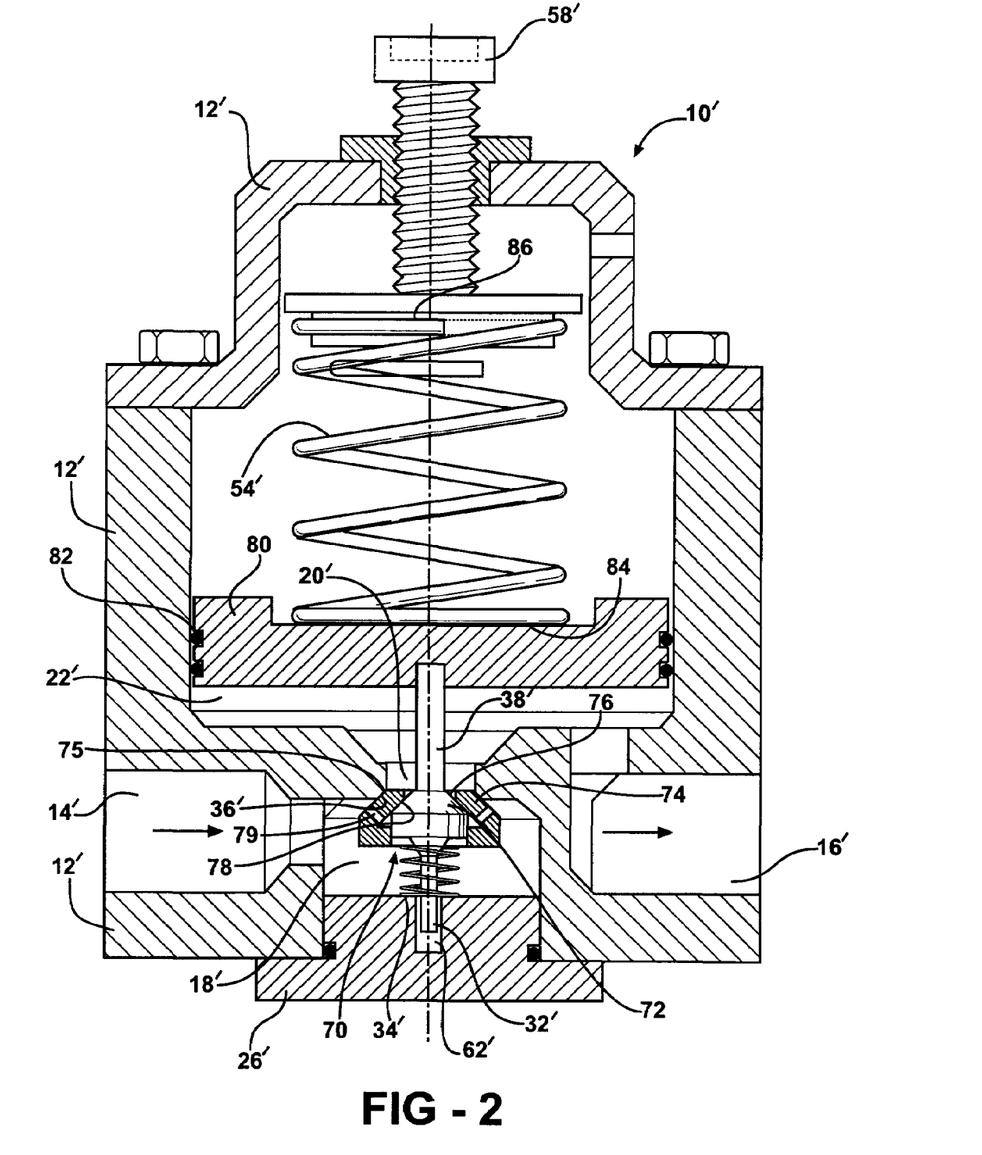
FIG. 2 is a cross sectional view of a pressure regulator in accordance with an embodiment of the invention showing valve heads in closed positions.
Figure 3:
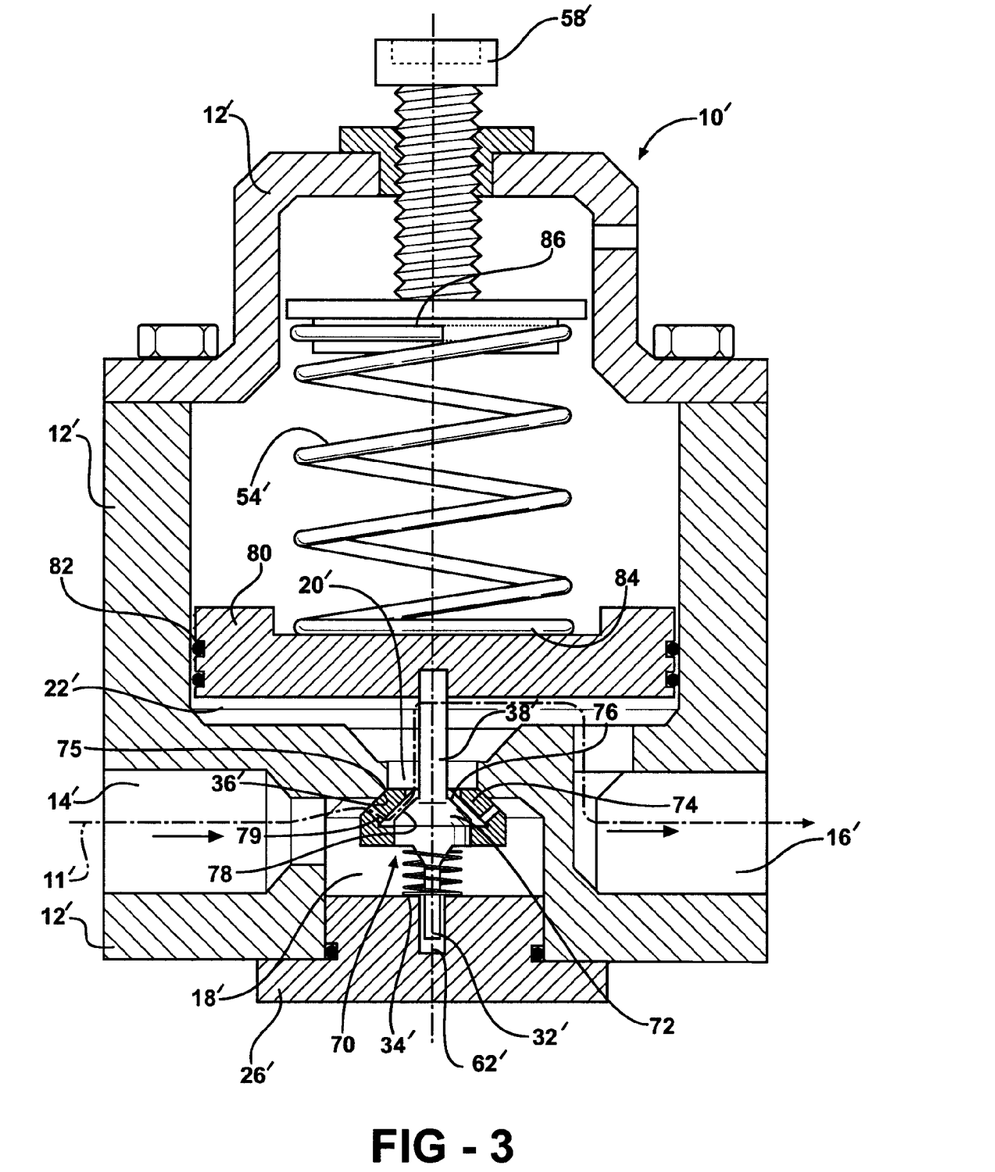
FIG. 3 is a cross sectional view of the pressure regulator illustrated in FIG. 2, showing the valve heads positioned for low flow rates.
Figure 4:
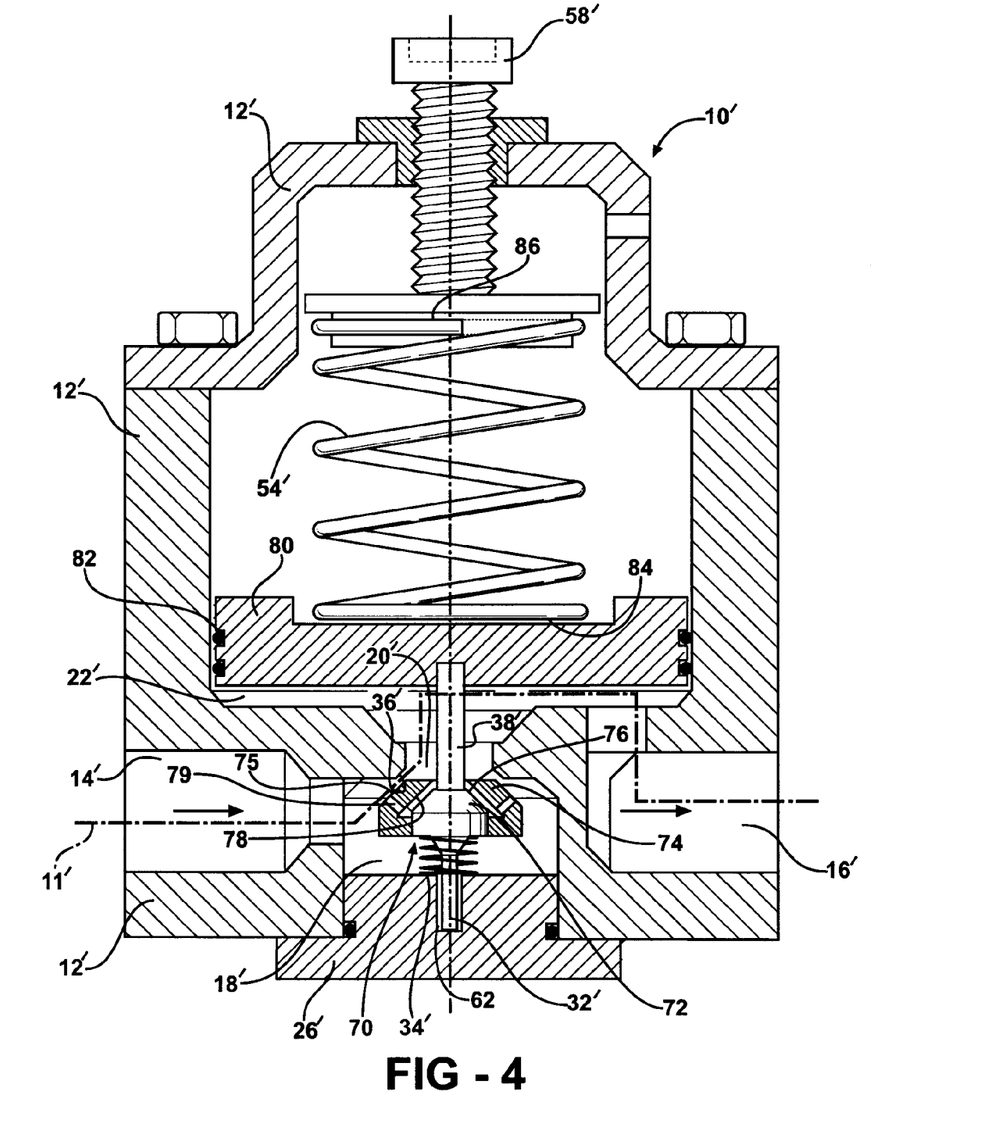
FIG. 4 is a cross sectional view of the pressure regulator illustrated in FIG. 2, showing the valve heads positioned for relatively high flow rates.

FIGS. 2-4 illustrate a flow control pressure regulator 10' having regulator body 12' in accordance with an embodiment of the invention. Similar structure to that described above for FIG. 1 repeated herein with respect to FIGS. 2-4 includes the same reference numeral and a prime (') symbol. A dual headed valve 70 disposed in a first chamber 18' includes a first head 72, a second head 74, a valve body 32', and a valve spring 34' disposed around the valve body 32'. The first head 72 includes a tapered end 76 seated against a corresponding tapered inner surface 78 of the second head 74. The second head 74 has a tapered end 75 and includes an aperture 79 formed therein. The tapered end 75 of the second head 74 seats against a tapered valve seat 36' provided at an entrance portion of an orifice 20'. The valve spring 34' urges the first head 72 into engagement with the tapered inner surface 78. An adjustment element 26' is disposed in an aperture formed in the regulator body 12'. A shaft 38' is interposed between the first head 72 and a sealing member 80. The sealing member 80 is reciprocatingly disposed in the second chamber 22'. A pair of o-rings 82 is disposed between the sealing member 80 and a wall forming the second chamber 22' to form a fluid-tight seal therebetween. It is understood that a regulator body 12' as discussed above for FIG. 1 including a cylindrical member (not shown) and a membrane assembly (not shown) can be used as described above in place of the sealing member 80 without departing from the spirit or scope of the invention.

A spring 54' is positioned within the second chamber 22'. A first end 84 of the spring 54' abuts the sealing member 80 and a second end 86 of the spring 54' abuts an adjustment screw 58'. The spring 54' applies a bias against the sealing member 80 as set by the adjustment screw 58'. A force applied by the spring 54' to the sealing member 80 can be adjusted by rotating the adjustment screw 58' to change an amount of compression of the spring 54'.

In use in a fuel cell, fluid flow is introduced at an inlet port 14', flows along a flow path 11' and exits the regulator 10' at an outlet port 16'. The fluid from the inlet port 14' flows through a first chamber 18', then through an orifice 20' and into a second chamber 22' that is in fluid communication with the outlet port 16'. The flow of the fluid from the inlet port 14' to the outlet port 16' is controlled by the dual headed valve 70 positioned within the first chamber 18'. When a greater hydrogen flow rate is required, hydrogen flow away from the outlet port 16' increases, which results in a decrease in the pressure at the outlet port 16'. The decrease in pressure is transferred to the portion of the chamber 22' below the sealing member 80, thereby permitting the spring 54' to extend linearly. Therefore, the sealing member and the shaft 38' move downwardly. The downward movement of the shaft 38' causes at least a portion of the valve body 32' to be positioned in a bore 62' formed in the adjusting element 26'. The first head 72 is caused to move further from the tapered inner surface 78 of the second head 74 and permit additional hydrogen flow from the inlet port 14' through the orifice 20'. This position is illustrated in FIG. 3. Hydrogen is permitted to pass through the aperture 79 formed in the second head 74, and through the orifice 20' to the outlet port 16'.

When a maximum flow rate of the first head 72 is reached, the sealing member 80 and the shaft 38' are caused to move further downward. The second head 74 is caused to unseat from the valve seat 36'. The unseating of the second head 74 permits additional hydrogen to flow from the inlet port 14', through the orifice 20', and to the outlet port 16', as shown in FIG. 4. As the demand for hydrogen decreases, hydrogen flow away from the outlet port 16' decreases, which results in an increase in the pressure at the outlet port 16'. The increase in pressure is transferred to the portion of the chamber 22' below the sealing member 80, thereby causing the spring 54' to compress linearly. This causes the second head 74 to move closer to the valve seat 36' and reduces the hydrogen flow rate through the space between the second head 74 and the valve seat 36'. When the flow rate reaches a predetermined level, the second head 74 is caused to seat against the valve seat 36' and hydrogen flow therethrough is militated against.

By using the pressure regulator 10' having the dual headed valve 70, a turn-down ratio is maximized and an efficiency in accommodating low flow rates therethrough is maximized due to the accommodation of low flow by the first head 72 only, and the accommodation of higher flow by a combination of the first head 72 and the second head 74.

Figure 5:
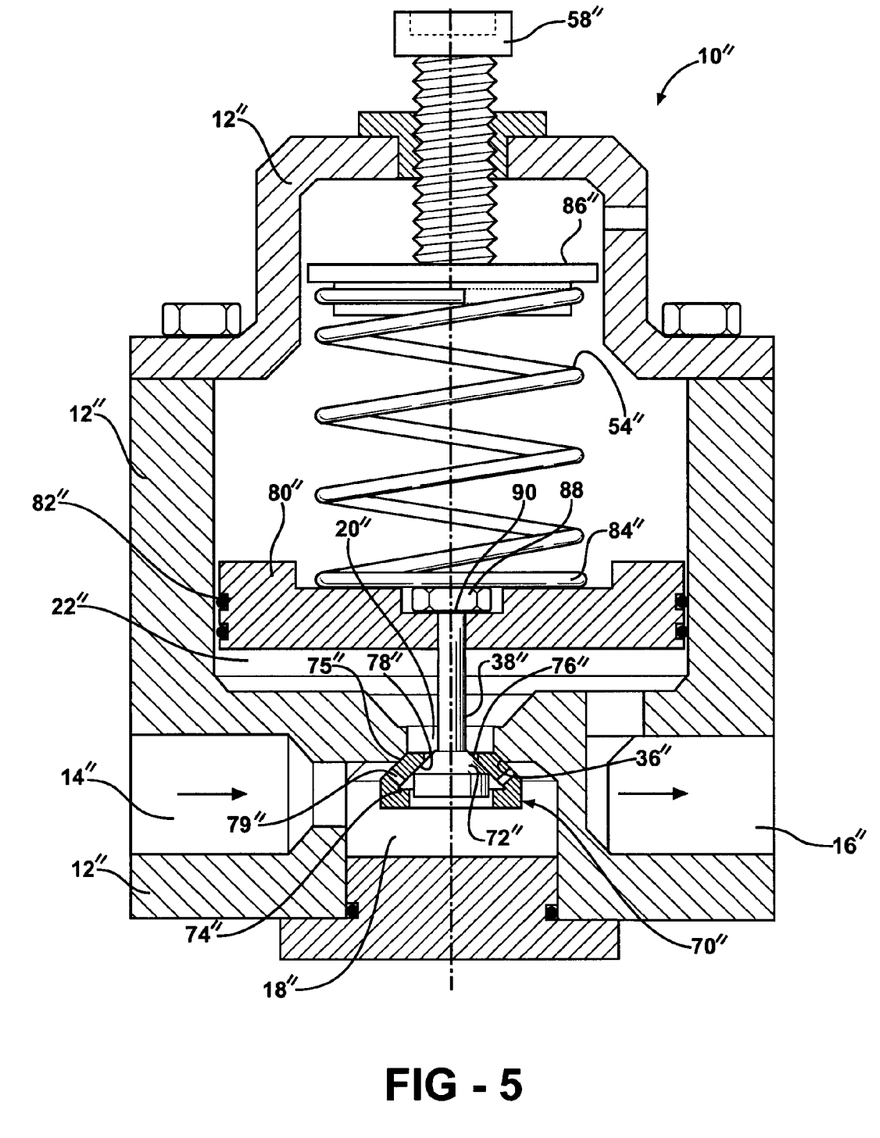
FIG. 5 is a cross sectional view of a pressure regulator in accordance with another embodiment of the invention.

FIG. 5 illustrates a flow control pressure regulator 10" having a regulator body 12" in accordance with another embodiment of the invention. Similar structure to that described above for FIGS. 1-4 repeated herein with respect to FIG. 5 includes the same reference numeral and a double prime (") symbol. A dual headed valve 70" disposed in a first chamber 18" includes a first head 72" and a second head 74". The first head 72" includes a tapered end 76" seated against a corresponding tapered inner surface 78" of the second head 74". The second head 74" has a tapered end 75" and includes an aperture 79" formed therein. The tapered end 75" of the second head 74" seats against a tapered valve seat 36" provided at an entrance portion of an orifice 20". A shaft 38" is interposed between the first head 72" and a sealing member 80". The sealing member 80" is reciprocatingly disposed in the second chamber 22". A pair of o-rings 82" is disposed between the sealing member 80" and a wall forming the second chamber 22" to form a fluid-tight seal therebetween. It is understood that a regulator body 12" as discussed above for FIG. 1 including a cylindrical member (not shown) and a membrane assembly (not shown) can be used as described above in place of the sealing member 80" without departing from the spirit or scope of the invention.

A spring 54" is positioned within the second chamber 22". A first end 84" of the spring 54" abuts the sealing member 80" and a bolt 88 and a second end 86" of the spring 54" abuts an adjustment screw 58". The spring 54" applies a bias against the sealing member 80" and the bolt 88 as set by the adjustment screw 58". The bolt 88 is attached to a first end 90 of the shaft 38". A force applied by the spring 54" to the sealing member 80" and the bolt 88 can be adjusted by rotating the adjustment screw 58" to change an amount of compression of the spring 54".

In use in a fuel cell, fluid flow is introduced at an inlet port 14", flows along a flow path 11" and exits the regulator 10" at an outlet port 16". The fluid from the inlet port 14" flows through a first chamber 18", then through an orifice 20" and into a second chamber 22" that is in fluid communication with the outlet port 16". The flow of the fluid from the inlet port 14" to the outlet port 16" is controlled by the dual headed valve 70" positioned within the first chamber 18". When a greater hydrogen flow rate is required, hydrogen flow away from the outlet port 16" increases, which results in a decrease in the pressure at the outlet port 16". The decrease in pressure is transferred to the portion of the chamber 22" below the sealing member 80", thereby permitting the spring 54" to extend linearly. Therefore, the sealing member and the shaft 38" move downwardly. The downward movement of the shaft 38" causes the first head 72" to move further from the tapered inner surface 78" of the second head 74" and permit additional hydrogen flow from the inlet port 14" through the orifice 20". Hydrogen is permitted to pass through the aperture 79" formed in the second head 74", and through the orifice 20" to the outlet port 16".

When a maximum flow rate of the first head 72" is reached, the sealing member 80" and the shaft 38" are caused to move further downward. The second head 74" is caused to unseat from the valve seat 36". The unseating of the second head 74" permits additional hydrogen to flow from the inlet port 14", through the orifice 20", and to the outlet port 16". As the demand for hydrogen decreases, hydrogen flow away from the outlet port 16" decreases, which results in an increase in the pressure at the outlet port 16". The increase in pressure is transferred to the portion of the chamber 22" below the sealing member 80, thereby causing the spring 54" to compress linearly. This causes the second head 74" to move closer to the valve seat 36" and reduces the hydrogen flow rate through the space between the second head 74" and the valve seat 36". When the flow rate reaches a predetermined level, the second head 74" is caused to seat against the valve seat 36" and hydrogen flow therethrough is militated against.

By using the pressure regulator 10" having the dual headed valve 70", a turn-down ratio is maximized and an efficiency in accommodating low flow rates therethrough is maximized due to the accommodation of low flow by the first head 72" only, and the accommodation of higher flow by a combination of the first head 72" and the second head 74".

Figure 6:
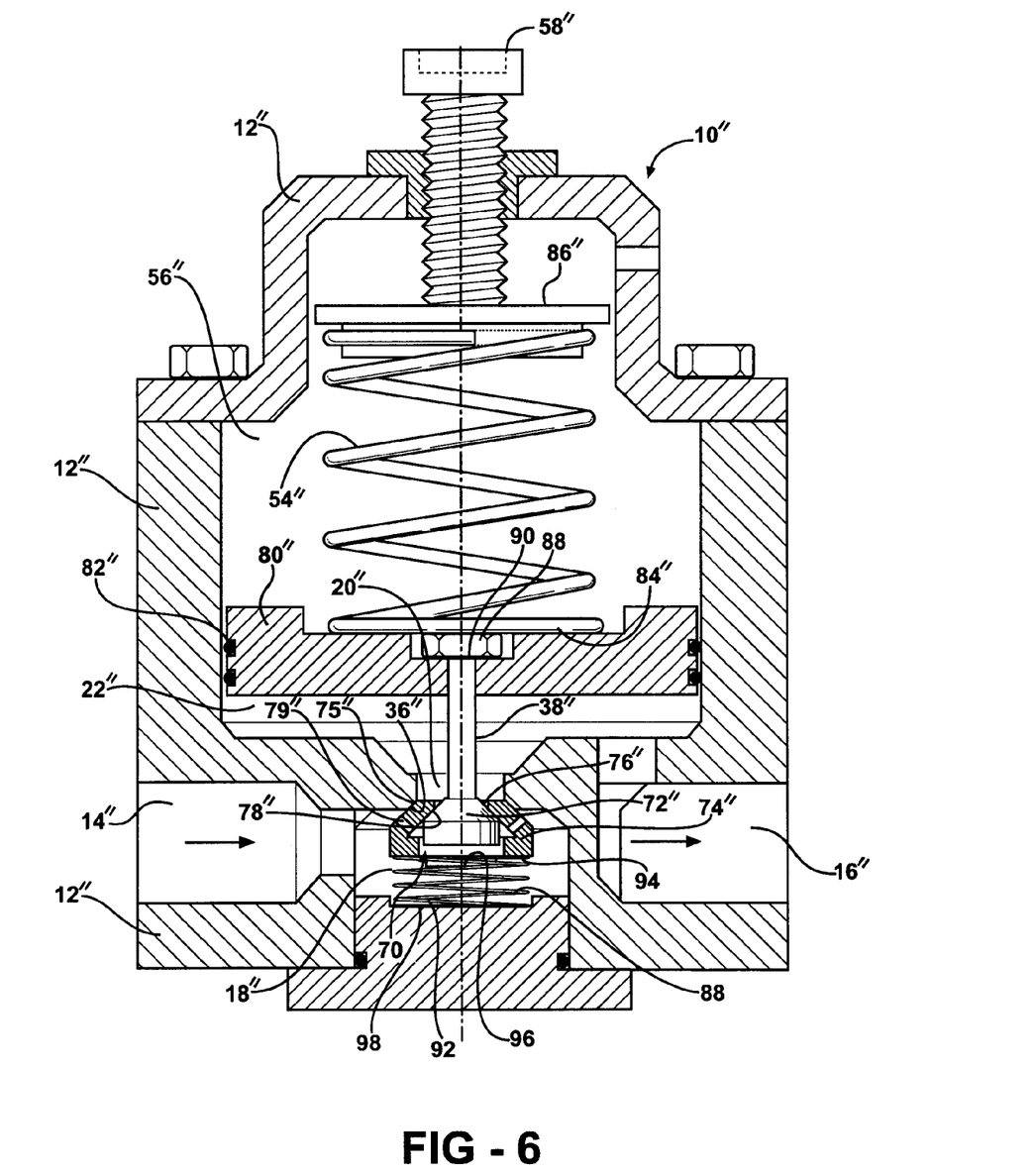
FIG. 6 is a cross sectional view of a pressure regulator in accordance with another embodiment of the invention.

Optionally, a second spring 92 can be disposed in the first chamber 18" as shown in FIG. 6. A first end 96 of the second spring 92 contacts a first end 94 of the second head 74" of the dual headed valve 70". A second end 98 of the second spring 92 contacts an inner surface of the regulator body 12" or an adjustment element (not shown). The second spring 92 urges the second head 74" towards a seated position during low flow rate operation.

Figure 7:
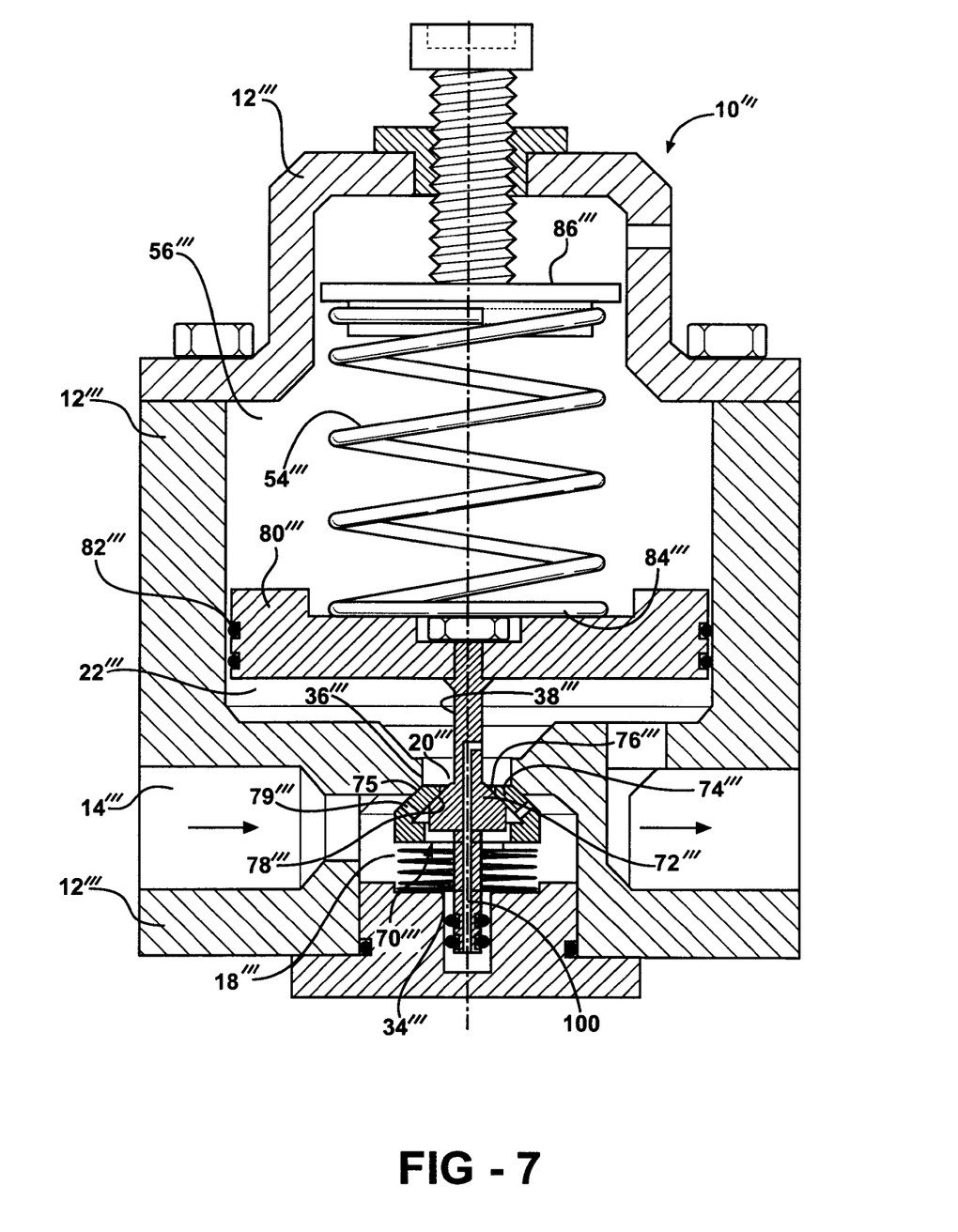
FIG. 7 is a cross sectional view of a pressure regulator in accordance with another embodiment of the invention.

FIG. 7 illustrates a pressure regulator 10''' in accordance with another embodiment of the invention. Similar structure to that described above for FIGS. 1-6 repeated herein with respect to FIG. 7 includes the same reference numeral and a triple prime ('") symbol. In this embodiment, the shaft 38''' includes a hollow opening 100 formed therein to facilitate a pressure equalization of the regulator 10'''. The hollow opening 100 minimizes forces exerted on the valve heads 72''', 74''' by allowing an escape for excessive pressure from the pressure regulator 10'''. It is understood that the hollow opening 100 can be formed in the shafts 38, 38', 38" illustrated in FIGS. 1-6 without departing from the spirit or scope of the invention.

Figure 8:
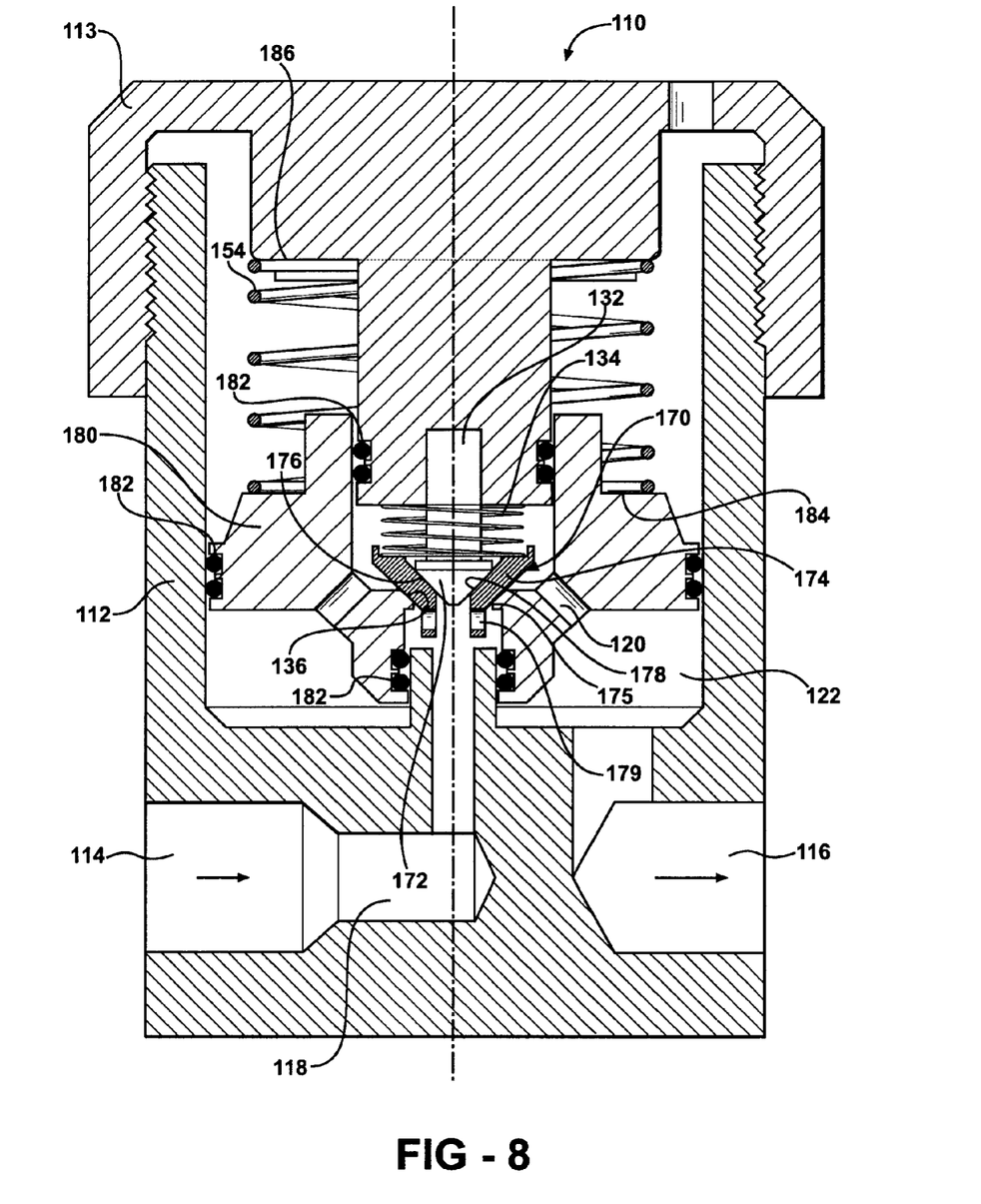
FIG. 8 is a cross sectional view of a pressure regulator in accordance with another embodiment of the invention showing valve heads in closed positions.
Figure 9:
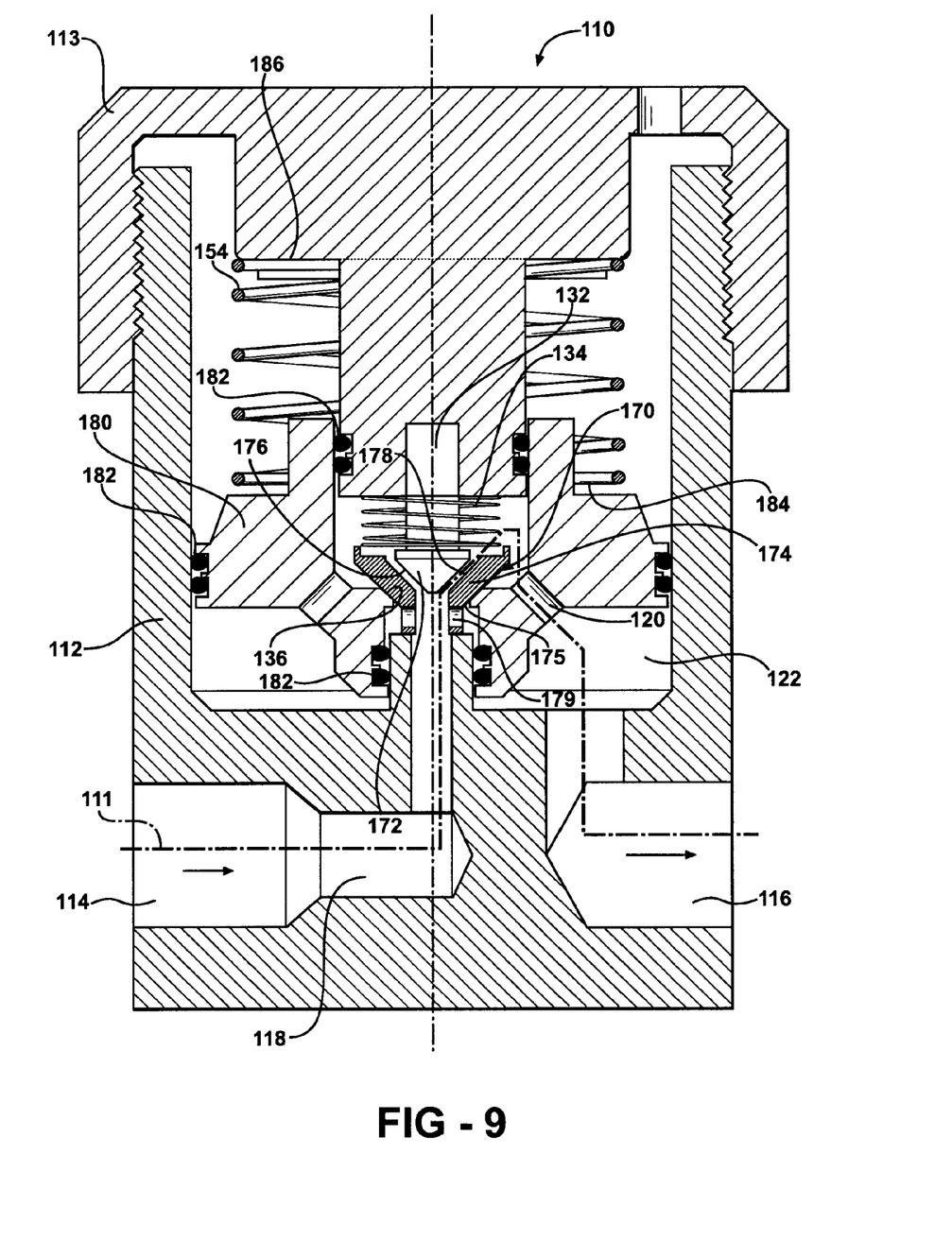
FIG. 9 is a cross sectional view of the pressure regulator illustrated in FIG. 8, showing the valve heads positioned for relatively low flow rates.
Figure 10:
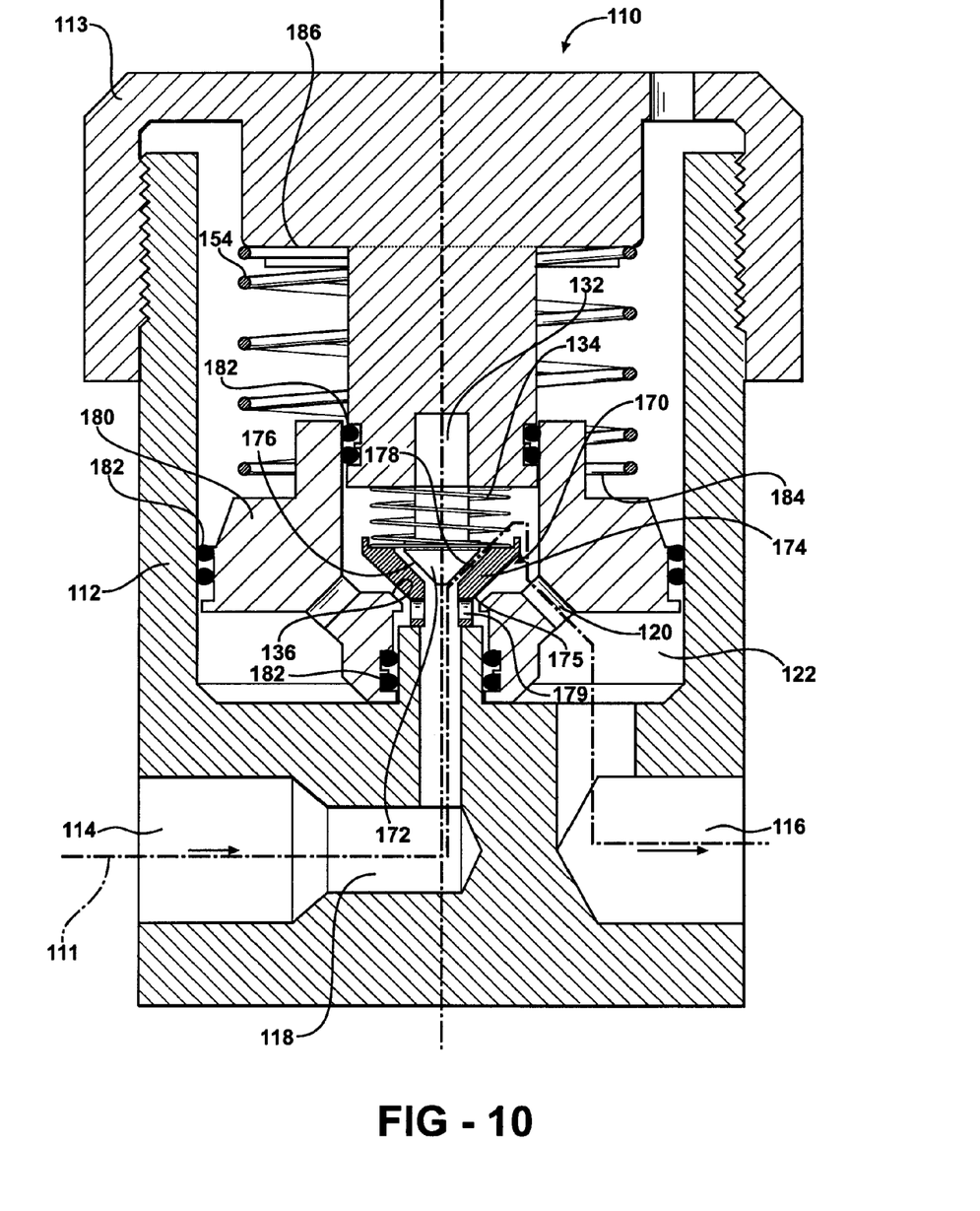
FIG. 10 is a cross sectional view of the pressure regulator illustrated in FIG. 8, showing the valve heads positioned for relatively high flow rates.

FIGS. 8-10 illustrate a pressure regulator 110 having a regulator body 112 in accordance with another embodiment of the invention. A dual headed valve 170 is disposed in the second chamber 122 and includes a first head 172, a second head 174, a valve body 132, and a valve spring 134 disposed around the valve body 132. The first head 172 and the valve body 132 are reciprocatingly mounted on a cap section 113 that is screwed to the regulator body 112. The first head 172 includes a tapered end 176 seated against a corresponding tapered inner surface 178 of the second head 174. The second head 174 has a tapered end 175 and an aperture 179 formed therein. The tapered end 175 of the second head 174 seats against a tapered valve seat 136 provided adjacent an entrance portion of the orifice 120. The valve spring 134 urges the second head 174 into engagement with the tapered valve seat 136. The sealing member 180 is disposed in the second chamber 122 and sealingly and reciprocatingly engages the regulator body 112. A plurality of o-rings 182 is disposed between the sealing member 180 and the second chamber 122 and between the sealing member 180 and the regulator body 112 to form fluid-tight seals therebetween. It is understood that a regulator body as discussed above for FIG. 1 including a cylindrical member (not shown) and a membrane assembly (not shown) can be used as described above without departing from the spirit or scope of the invention.

A second spring 154 is positioned within the second chamber 122. A first end 184 of the spring 154 abuts the sealing member 180 and a second end 186 of the spring 154 abuts the cap section 113. The spring 154 applies a bias against the sealing member 180 as set by the cap section 113. A force applied by the spring 154 to the sealing member 180 can be adjusted by rotating the cap section 113 to change an amount of compression of the spring 154.

In use, fluid flow is introduced at an inlet port 114, flows along a flow path 111 and exits the regulator 110 at an outlet port 116. The fluid from the inlet port 114 flows through a first chamber 118, through an orifice 120, and into a second chamber 122 in fluid communication with the outlet port 116. The flow of the fluid from the inlet port 114 to the outlet port 116 is controlled by a dual headed valve 170 positioned within the second chamber 122. When a greater hydrogen flow rate is required, hydrogen flow away from the outlet port 116 increases, which results in a decrease in pressure at the outlet port 116. The decrease in pressure is transferred to the portion of the chamber 122 below the sealing member 180, thereby permitting the spring 154 to extend linearly. Therefore, sealing member 180 moves downwardly. The downward movement of the sealing member 180 causes the second head 174 to move further from the tapered first end 176 of the first head 172 and permit additional hydrogen flow from the inlet port 114 to the orifice 120. This position is illustrated in FIG. 9. Hydrogen is permitted to pass through the opening 186 created between the first head 172 and the second head 174, and through the orifice 120 to the outlet port 116.

When a maximum flow rate of opening 186 is reached, the sealing member 180 is caused to move further downward. The second head 174 is caused to unseat from the valve seat 136. The unseating of the second head 174 permits additional hydrogen to flow from the inlet port 114, through the aperture 179 formed in the second head 174, through the orifice 120, and to the outlet port 116. This position is illustrated in FIG. 10. As the demand for hydrogen decreases, hydrogen away from the outlet port 116 decreases, which results in an increase in pressure at the outlet port 116. The increase in pressure is transferred to the portion of the chamber 122 below the sealing member 180, thereby causing sealing member 180 to move upwardly. This causes the valve seat 136 to move closer to the second head 174 and reduces the hydrogen flow rate through the aperture 179 formed in the second head 174. When the flow rate reaches a predetermined level, the valve seat 136 is caused to seat against the second head 174 and hydrogen flow therethrough is militated against.

By using the pressure regulator 110 having the dual headed valve 170, a turn-down ratio is maximized and an efficiency in accommodating low flow rates therethrough is maximized due to the accommodation of low flow by the second head 174 only, and the accommodation of higher flow by a combination of the first head 172 and the second head 174.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A pressure regulator comprising:
   a main body defining a valve seat and a flow path, the flow path having an inlet and an outlet;
   a valve assembly disposed in the main body along the flow path and including a first head and a second head, the first head being movable with respect to and sealable with the second head, the second head being movable with respect to and sealable with the valve seat, wherein the first head facilitates flow of a fluid in a first range of flow rates and the first head and the second head cooperate to facilitate flow of the fluid in a second range of flow rates;
   a sealing member disposed in the main body and coupled to the valve assembly, wherein the sealing member slideably engages a portion of the main body to form a seal therebetween;
   a first spring disposed between the main body and the sealing member; and
   a second spring disposed between the main body and the valve assembly,
   wherein the second spring is disposed between the main body and the second head.

2. The pressure regulator according to claim 1, wherein the flow path includes an orifice.

3. The pressure regulator according to claim 1, wherein the valve seat has a tapered inner surface adapted to seal against a tapered surface formed on the second head and the second head has a tapered inner surface adapted to seal against and a tapered surface formed on the first head.

4. The pressure regulator according to claim 1, wherein the valve assembly and the sealing member are disposed in a chamber formed in the main body.

5. The pressure regulator according to claim 1, wherein the valve assembly is disposed in a first chamber formed in the main body and the sealing member is disposed in a second chamber formed in the main body.

6. The pressure regulator according to claim 5, wherein the sealing member is reciprocatingly disposed in the second chamber.

7. The pressure regulator according to claim 1, wherein the valve assembly includes a valve shaft contacting the sealing member.

8. The pressure regulator according to claim 7, wherein the second head is reciprocatingly disposed on the valve shaft.

9. The pressure regulator according to claim 7, wherein the valve shaft includes a hollow opening formed therein for facilitating an adjustment of forces exerted on the valve assembly.

10. The pressure regulator according to claim 1, wherein the second spring is disposed between the main body and the first head.

11. A pressure regulator comprising:
    a main body defining a flow path, the flow path having an inlet and an outlet;
    a sealing member defining a valve seat and an orifice, the sealing member reciprocatingly disposed in a second chamber formed in the main body, wherein the sealing member slideably engages a portion of the main body to form a seal therebetween;
    a valve assembly disposed in a first chamber formed in the main body and coupled to the sealing member, the valve assembly including a first head and a second head, the first head being movable with respect to and sealable with the second head, the second head being movable with respect to and sealable with the valve seat;
    a first spring disposed between the main body and the sealing member;
    a second spring disposed between the main body and the second head;

an inlet port formed in the main body in fluid communication with the first chamber and the flow path; and an outlet port formed in the main body in fluid communication with the second chamber and the flow path.

12. The pressure regulator according to claim 11, wherein the second head facilitates flow of a fluid in a first range of low flow rates and the first head and the second head cooperate to facilitate flow of the fluid in a second range of flow rates.

13. The pressure regulator according to claim 11, wherein the valve seat has a tapered inner surface adapted to seal against a tapered surface formed on the second head and the second head has a tapered inner surface adapted to seal against and a tapered surface formed on the first head.

14. The pressure regulator according to claim 11, wherein the valve assembly includes a valve shaft contacting the sealing member.

15. The pressure regulator according to claim 14, wherein the second head is reciprocatingly disposed on the valve shaft.

* * * * *